(12) United States Patent
Giroux et al.

(10) Patent No.: US 9,477,480 B2
(45) Date of Patent: Oct. 25, 2016

(54) SYSTEM AND PROCESSOR FOR IMPLEMENTING INTERRUPTIBLE BATCHES OF INSTRUCTIONS

(71) Applicant: NVIDIA Corporation, Santa Clara, CA (US)

(72) Inventors: Olivier Giroux, Santa Clara, CA (US); Robert Ohannessian, Jr., Austin, TX (US); Jack H. Choquette, Palo Alto, CA (US); Michael Alan Fetterman, Boxborough, MA (US)

(73) Assignee: NVIDIA Corporation, Santa Clara, CA (US)

( * ) Notice: Subject to any disclaimer, the term of this patent is extended or adjusted under 35 U.S.C. 154(b) by 347 days.

(21) Appl. No.: 14/169,082

(22) Filed: Jan. 30, 2014

(65) Prior Publication Data

US 2015/0212819 A1    Jul. 30, 2015

(51) Int. Cl.
*G06F 9/00*         (2006.01)
*G06F 9/38*         (2006.01)

(52) U.S. Cl.
CPC .......... *G06F 9/3832* (2013.01); *G06F 9/3851* (2013.01); *G06F 9/3853* (2013.01); *G06F 9/3861* (2013.01); *G06F 9/3836* (2013.01)

(58) Field of Classification Search
CPC ........................... G06F 9/3853; G06F 9/3836
See application file for complete search history.

(56) References Cited

U.S. PATENT DOCUMENTS

| | | | |
|---|---|---|---|
| 6,882,968 B1 * | 4/2005 | Linden | G06F 9/45504 703/26 |
| 2013/0057563 A1 * | 3/2013 | Persson | G06F 9/485 345/522 |

\* cited by examiner

*Primary Examiner* — Zachary K Huson
(74) *Attorney, Agent, or Firm* — Zilka-Kotab, PC (57) ABSTRACT

A system, method, and computer program product are provided for scheduling interruptible hatches of instructions for execution by one or more functional units of a processor. The method includes the steps of receiving a batch of instructions that includes a plurality of instructions and dispatching at least one instruction from the batch of instructions to one or more functional units for execution. The method further includes the step of receiving an interrupt request that causes an interrupt routine to be dispatched to the one or more functional units prior to all instructions in the batch of instructions being dispatched to the one or more functional units. When the interrupt request is received, the method further includes the step of storing batch-level resources in a memory to resume execution of the batch of instructions once the interrupt routine has finished execution.

20 Claims, 6 Drawing Sheets

SYSTEM AND PROCESSOR FOR IMPLEMENTING INTERRUPTIBLE BATCHES OF INSTRUCTIONS

FIELD OF THE INVENTION

The present invention relates to processor architectures, and more particularly to processors capable of processing interruptible batches of instructions.

BACKGROUND

Many of the conventional multi-threaded processors on the market today include hardware scheduling units that arbitrate issuing instructions to be executed among a plurality of active threads. The scheduling unit determines whether the next instruction for each thread has any dependencies that have not been resolved, and, among all threads having a next instruction with no unresolved dependencies, selects one thread and issues the next instruction from the thread. Such arbitration is conducted one instruction at a time.

For power reasons, it could be beneficial to resolve dependencies for multiple instructions at a time and then issue the multiple instructions in a batch. Such operation may be beneficial because the batch of instructions will typically be executed in a fewer number of clock cycles than if dependencies are resolved and instructions are issued one at a time. For example, latency related to fetching operands from a memory may be resolved at the beginning of the batch instead of spreading out the latency throughout the execution of the batch. This may allow for more efficient power savings techniques or allow more efficient use of resources by other active threads. Additional power savings may be realized by reducing the frequency that the scheduler executes (e.g., once per batch of instructions rather than once per instruction), utilizing low-power pipeline resources (e.g., register-file bypass, temporary pipeline storage, etc.), and other such power saving techniques.

One issue with issuing batch instructions in this manner, however, is that the batch of instructions may be interrupted after the batch has been scheduled for execution but before each instruction in the batch has been issued and committed by the associated pipeline. Interrupt routines may be necessary to implement breakpoints in a debugger, single-stepping through instructions in a debugger, floating point exceptions, instruction replays, memory addressing faults, memory breakpoints, tolerance of compiler bugs, cache misses, pre-emption, and other capabilities that require interruption of a batch of instructions. It will be appreciated that batches may be interrupted for reasons other than the service of interrupt routines; for example, batches may be interrupted to perform a memory access in response to a cache miss or to service a floating-point exception. Resources reserved for the batch of instructions (e.g., registers in a register file) may be allocated to execute the interrupt routine. Conventional processor architectures are not configured to implement schedulers that are capable of issuing batches of instructions while also enabling those batches of instructions to be interrupted. Thus, there is a need for addressing this issue and/or other issues associated with the prior art.

SUMMARY

A system, method, and computer program product are provided for scheduling interruptible hatches of instructions for execution by one or more functional units of a processor. The method includes the steps of receiving a batch of instructions that includes a plurality of instructions and dispatching at least one instruction from the batch of instructions to one or more functional units for execution. The method further includes the step of receiving an interrupt request that causes an interrupt routine to be dispatched to the one or more functional units prior to all instructions in the batch of instructions being dispatched to the one or more functional units. When the interrupt request is received, the method further includes the step of storing batch-level resources in a memory to resume execution of the batch of instructions once the interrupt routine has finished execution.

DETAILED DESCRIPTION

A processor includes a scheduler unit that is configured to enable batches of instructions to be interrupted by various interrupt routines and/or pre-empted by the execution of instructions from other threads. In the context of the present description, a batch of instructions is a sequence of instructions for one or more threads that access particular batch-level resources such as temporary registers or are associated with certain scheduling constraints such as instructions that take advantage of register-file bypass signals. Bypass values are values that are generated by one functional unit for input into another functional unit without being intermediately stored in a register file. Temporary values may be special registers associated with a functional unit that hold temporary values for subsequent instructions. In one embodiment, the scheduler unit allocates a particular portion of the register file (i.e., a backing store) to a batch of instructions for storage of the batch-level resources when a batch is interrupted. The particular portion of the register file is not re-allocated until the batch has finished execution. It will be appreciated that, in other embodiments, a different backing store may be used to store batch-level resources than the register file.

Figure 1:
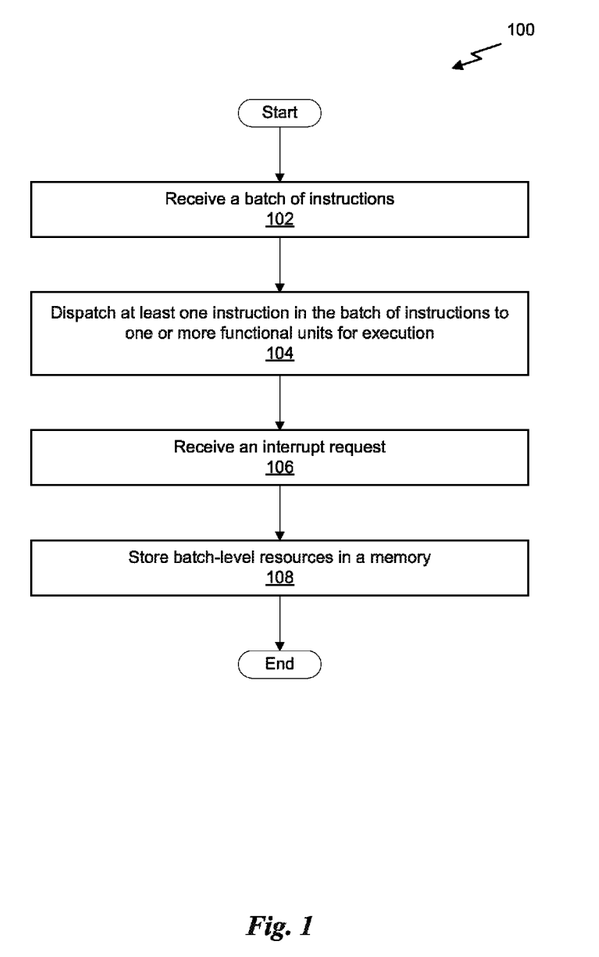
FIG. 1 illustrates a flowchart of a method for scheduling interruptible batches of instructions, according to one embodiment.

FIG. 1 illustrates a flowchart of a method 100 for scheduling interruptible batches of instructions, according to one embodiment. At step 102, a batch of instructions that includes a plurality of instructions is received. At step 104, at least one instruction from the batch of instructions is dispatched to one or more functional units for execution. The instructions may be dispatched to the one or more functional units by a scheduler unit configured to arbitrate between two or more active threads and select instructions from a particular thread or threads for dispatch to the functional units during a particular clock cycle. At step 106, an interrupt request is received. The interrupt request causes the scheduler unit to prioritize dispatch of instructions from an interrupt routine over instructions from the batch of instructions, thereby pre-empting execution of the batch of instructions in favor of instructions from the interrupt routine. At step 108, batch-level resources are stored in a memory to resume execution of the batch of instructions once the interrupt routine has finished execution. In one embodiment, the scheduler unit may store the batch-level resources in a portion of the register file allocated to the batch of instructions.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
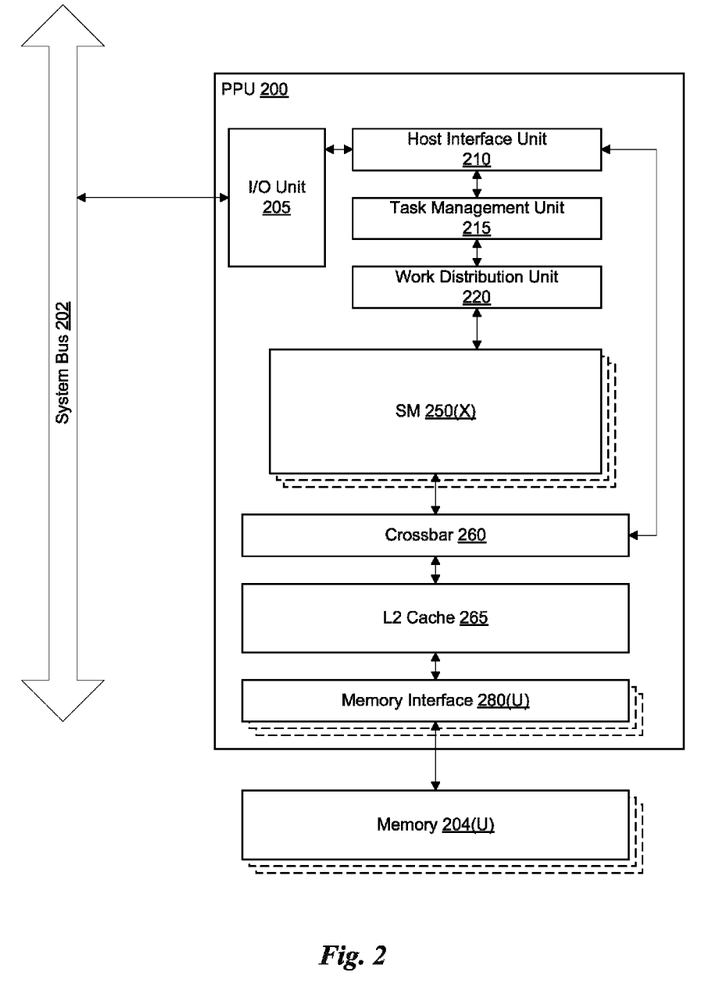
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-hit data buses, or the like, for high-speed data transfer. In one embodiment, the PPU 200 comprises memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the 12 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e. a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
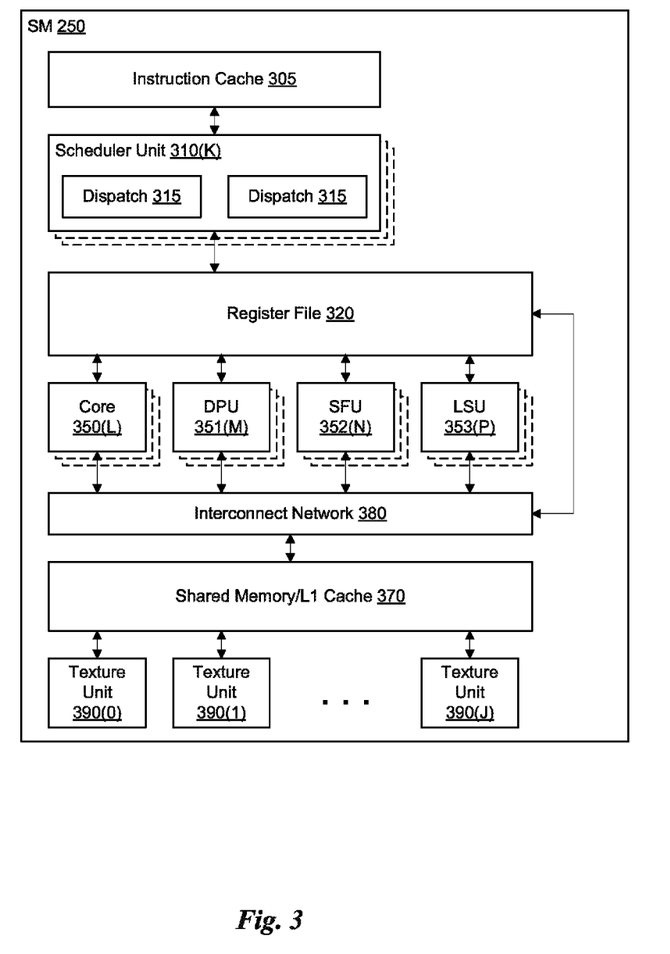
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Figure 4:
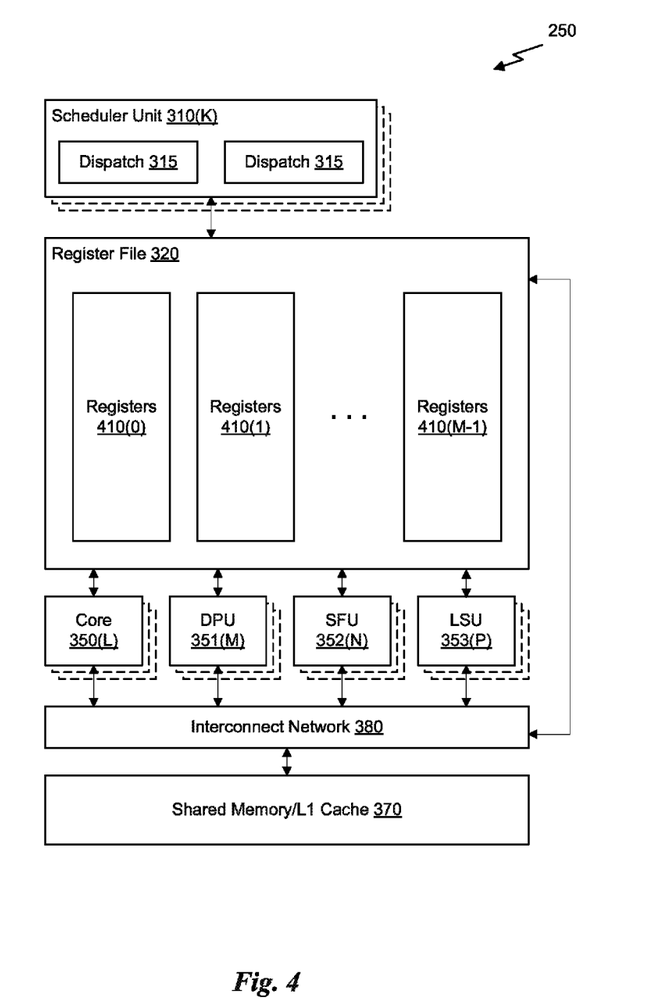
FIG. 4 illustrates a portion of an streaming multi-processor of FIG. 2 configured to schedule interruptible batches of instructions for execution, in accordance with one embodiment.

FIG. 4 illustrates a portion of an SM 250 of FIG. 2 configured to schedule interruptible batches of instructions for execution, in accordance with one embodiment. Again, as described above, the scheduler units 310 are coupled to the register file 320, which is coupled to the functional units 350, 351, 352, and 353. In one embodiment, each of the scheduler units 310 are configured to allocate a portion of registers 410 in the register file 320 to a particular batch of instructions specified in a thread. The scheduler unit 310 receives instructions for a plurality of threads. The instructions may be stored in a memory 204 and a pointer to the instructions is transmitted to the scheduler unit 310 to indicate the instructions are ready for execution. The scheduler unit 310 may manage a list of threads available to be scheduled.

At least some of the threads may include one or more batches of instructions. Again, a batch of instructions is a sequence of instructions for one or more threads that access particular batch-level resources, such as temporary registers, or are associated with certain scheduling constraints, such as instructions that take advantage of register-file bypass signals. Power savings may be realized when certain groups of instructions are executed together. For example, power savings may be realized when a group of arithmetic instructions is batched together by first loading operands for the instructions into the register file and then executing the arithmetic instructions only once all of the dependencies for the instructions have been resolved. Execution may be more efficient as the batch of instructions is not repeatedly stalled during execution of some instructions while other instructions wait for dependencies to be resolved.

In operation, the scheduler unit 310 may tag a batch of instructions from a thread as ready to be issued after the scheduler unit 310 has ensured that dependencies for each of the instructions in the batch of instructions have been resolved. When a program counter for a thread points to a first instruction in the batch of instructions, the scheduler unit 310 allocates a portion of the registers 410 in the register file for the batch of instructions. The portion of the registers 410 serves as a temporary storage for batch-level resources associated with the batch of instructions.

After the scheduler unit 310 allocates the portion of the registers 410 to a batch of instructions, the scheduler unit 310 monitors the batch of instructions to ensure that any dependencies for the instructions have been resolved. Such dependencies may be, e.g., resolved by having values loaded from the memory 204 into the register file 320 or by having values written into the register file 320 by one or more of the functional units of the SM 250. Once the dependencies for the instructions have been resolved, the batch of instructions is tagged as ready to be issued. The scheduler unit 310 may then arbitrate between multiple threads, selecting instructions from one or more batches of instructions that are ready to be issued to be dispatched to the functional units of the SM 250. In one embodiment, the scheduler unit 310 issues one instruction during each clock cycle, selecting an instruction from the same batch of instructions or other batches of instructions during each successive clock cycle. In another embodiment, the scheduler unit 310 may be configured to issue two or more instructions from a given batch of instructions in successive clock cycles.

The batch of instructions may be interrupted by other routines during execution. When the batch of instructions is interrupted, any batch-level resources associated with the batch of instructions are stored in the portion of the registers 410 allocated to the batch. For example, some instructions in the batch of instructions may implement chained operations. In a chained operation, the output of one functional unit may be connected to the input of another functional unit via the interconnect network 380. In conventional processors, the intermediate output is not stored in the register file 320 but instead is consumed immediately by the next functional unit. However, when a batch of instructions implementing a chained operation is interrupted, the next functional unit in the chained operation may be reserved for use by an instruction in the interrupt routine, meaning the transitory intermediate output value is lost. In one embodiment, in order to not lose transitory values when batches of instructions are interrupted, all outputs of the functional units are mirrored and stored in the portion of the registers 410 allocated to the corresponding batch of instructions, even if the output from the functional unit is coupled to the input of another functional unit for immediate consumption. In one embodiment, the output values may be stored in the portion of the registers 410 and may also be provided to the inputs of another functional unit in a single clock cycle. In another embodiment, the outputs of the functional units may also be stored out to a backing store such as memory 204.

In some use-cases, various interrupt points within the batch of instructions may be known before execution. For example, breakpoints and single-stepping capabilities of debuggers implemented by a compiler are known when the batch of instructions is compiled into a machine-executable code for execution. In such cases, the compiler may transcode batches of multiple instructions into multiple, single-instruction batches where any batch-level resources generated by the instructions are stored in the portion of the registers 410 allocated to the batch of instructions. This transcoding may reduce performance and/or increase power consumption of these batches of instructions by requiring the batch-level resources to be written to the register file 320 rather than being used directly within the functional unit for subsequent instructions. However, such reductions in performance may be inconsequential to a user due to specific use cases such as when running a debugger (e.g., a developer does not care that subsequent instructions are stalled when single-stepping through a program or implementing breakpoints within a program being simulated by the debugger).

In some embodiments, when the scheduler unit 310 begins executing a batch of instructions, the scheduler unit 310 does not allocate the portion of the registers 410 to the batch of instructions. Instead, the scheduler unit 310 only allocates the portion of the registers 410 when an interrupt occurs. As the scheduler unit 310 dispatches one or more instructions from the batch of instructions to the functional units, an interrupt may occur (e.g., such as a floating-point exception) that causes the scheduler unit 310 to prioritize execution of an interrupt routine over instructions from the batch of instructions. At this point, the scheduler unit 310 may allocate the portion of the registers 410 in the register file 320 for the batch of instructions. Batch-level resources may be written to the portion of the registers 410 associated with the batch of instructions being executed. In contrast to the previous embodiment in which the portion of the registers 410 is allocated immediately before execution of the batch of instructions is commenced, the scheduler unit 310 is configured to allocate registers for temporary storage of the batch-level resources in a just-in-time manner. In yet another embodiment, the scheduler unit 310 may not allocate storage for batch-level resources in the register file 320 because the resources in the register file 320 may be required for executing the interrupt routine. In such cases, the batch-level resources may be stored in the memory 204 by writing the batch-level resources to the shared memory/L1 cache 370. These batch-level resources can then be loaded from the memory 204, via the shared memory/L1 cache 370, back into the register file 320 and then ultimately back into the special registers in one or more functional units for execution of the remainder of the instructions in the batch of instructions.

Figure 5:
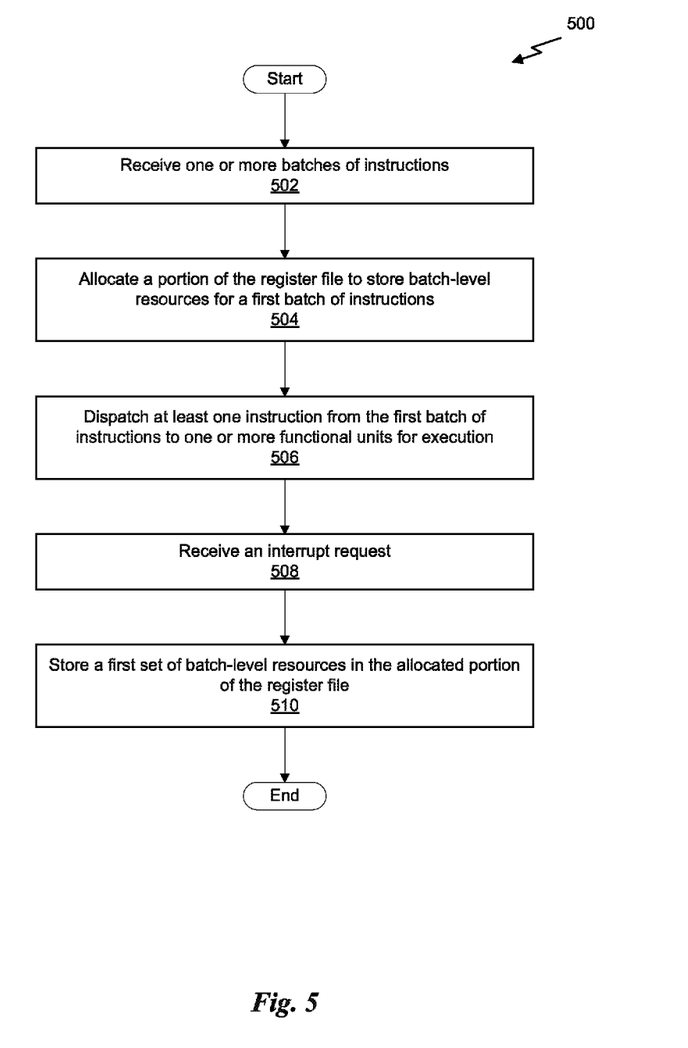
FIG. 5 illustrates a flowchart of a method for scheduling interruptible batches of instructions, according to another embodiment.

FIG. 5 illustrates a flowchart of a method 500 for scheduling interruptible batches of instructions, according to another embodiment. At step 502, the scheduler unit 310 receives one or more batches of instructions to be issued to one or more functional units. At step 504, the scheduler unit 310 allocates a portion of the registers 410 within the register file 320 to a first batch of instructions in the one or more batches of instructions. At step 506, the scheduler unit 310 dispatches at least one instruction from the first batch of instructions to the one or more functional units for execution.

At step 508, the scheduler unit 310 receives an interrupt request. In one embodiment, the scheduler unit 310 receives the interrupt request directly and proceeds to dispatch instructions from a particular interrupt routine associated with the interrupt request to the one or more functional units. In another embodiment, the interrupt request causes another unit within the PPU 200 or a host processor to transmit one or more instructions included in the interrupt routine to the scheduler unit 310. The instructions associated with the interrupt routine may have a higher priority than the instructions associated with the first batch of instructions that causes the scheduler unit 310 to select instructions from the interrupt routine for dispatch to the one or more functional units instead of instructions from the batch of instructions. At step 510, the scheduler unit 310 stores a first set of batch-level resources in the allocated portion of the registers 410.

Figure 6:
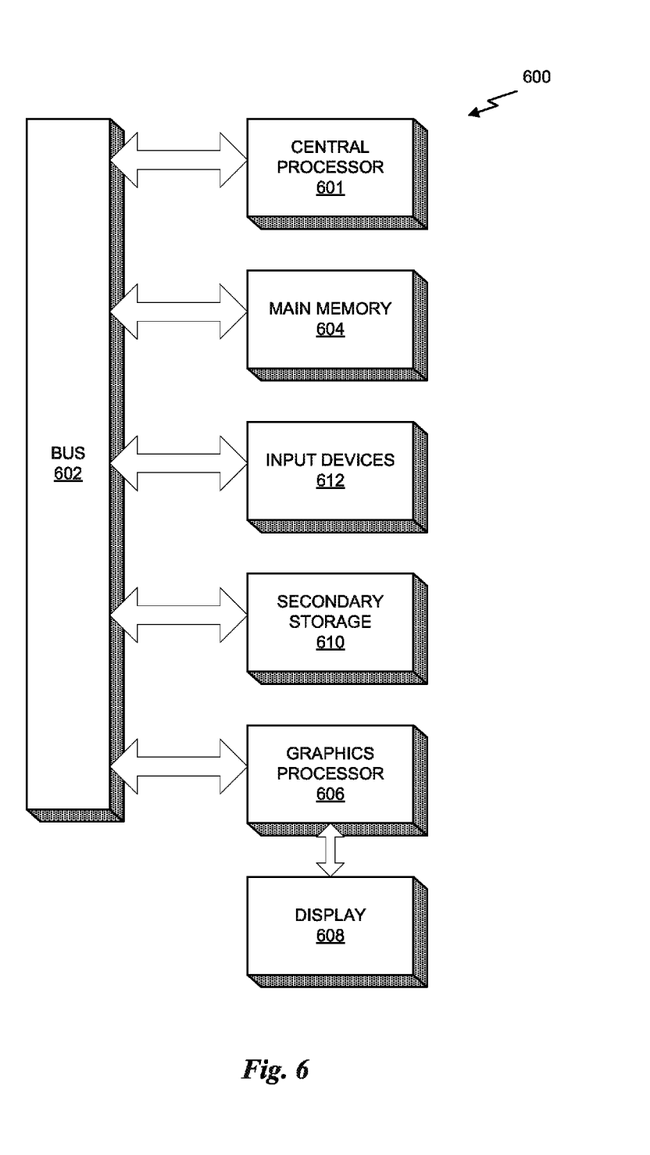
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
receiving a batch of instructions that includes a plurality of instructions;
dispatching, by a scheduler unit, at least one instruction from the batch of instructions to one or more functional units for execution;
receiving an interrupt request, at the scheduler unit, that causes the scheduler unit to dispatch an interrupt routine to the one or more functional units prior to all instructions in the batch of instructions being dispatched to the one or more functional units, wherein the interrupt routine includes one or more additional instructions that are not included in the batch of instructions, and wherein the scheduler unit is configured to prioritize the dispatching of the one or more additional instructions included in the interrupt routine over the plurality of instructions in the batch of instructions; and storing batch-level resources in a memory to resume execution of the batch of instructions once the interrupt routine has finished execution.

2. The method of claim 1, wherein the batch-level resources are stored in a portion of a register file allocated to the batch of instructions.

3. The method of claim 2, wherein the portion of the register file is allocated to the batch of instructions by the scheduler unit prior to dispatching the at least one instruction from the batch of instructions to one or more functional units for execution.

4. The method of claim 1, further comprising allocating a portion of a register file for storing the batch-level resources in response to receiving the interrupt request.

5. The method of claim 1, further comprising:
receiving a second batch of instructions; and
dispatching, by the scheduler unit, at least one instruction from the second batch of instructions to the one or more functional units for execution.

6. The method of claim 5, wherein the at least one instruction from the second batch of instructions is dispatched prior to dispatching every instruction in the batch of instructions to the functional units for execution.

7. The method of claim 6, wherein the scheduler unit is configured to arbitrate between the batch of instructions and the second batch of instructions to select an instruction to issue to the one or more functional units.

8. The method of claim 1, wherein the batch of instructions is associated with a thread block and an instruction from the batch of instructions is dispatched to a number of functional units in parallel during a single clock cycle.

9. The method of claim 1, wherein the batch-level resources are stored in a cache unit at a memory location allocated to the batch of instructions in response to receiving the interrupt request.

10. A non-transitory computer-readable storage medium storing instructions that, when executed by a processor, cause the processor to perform steps comprising:
receiving a batch of instructions that includes a plurality of instructions;
dispatching, by a scheduler unit, at least one instruction from the batch of instructions to one or more functional units for execution;
receiving an interrupt request, at the scheduler unit, that causes the scheduler unit to dispatch an interrupt routine to the one or more functional units prior to all instructions in the batch of instructions being dispatched to the one or more functional units, wherein the interrupt routine includes one or more additional instructions that are not included in the batch of instructions, and wherein the scheduler unit is configured to prioritize the dispatching of the one or more additional instructions included in the interrupt routine over the plurality of instructions in the batch of instructions; and
storing batch-level resources in a memory to resume execution of the batch of instructions once the interrupt routine has finished execution.

11. The non-transitory computer-readable storage medium of claim 10, wherein the batch-level resources are stored in a portion of a register file allocated to the batch of instructions, and wherein the portion of the register file is allocated to the batch of instructions by the scheduler unit prior to dispatching the at least one instruction from the batch of instructions to one or more functional units for execution.

12. The non-transitory computer-readable storage medium of claim 10, further comprising:
receiving a second batch of instructions; and
dispatching, by the scheduler unit, at least one instruction from the second batch of instructions to the one or more functional units for execution.

13. The non-transitory computer-readable storage medium of claim 12, wherein the at least one instruction from the second batch of instructions is dispatched prior to dispatching every instruction in the batch of instructions to the functional units for execution.

14. A system comprising:
one or more functional units configured to execute instructions; and
a scheduler unit configured to:
receive a batch of instructions that includes a plurality of instructions,
dispatch at least one instruction from the batch of instructions to the one or more functional units for execution,
receive an interrupt request that causes the scheduler unit to dispatch an interrupt routine to the one or more functional units prior to all instructions in the batch of instructions being dispatched to the one or more functional units, wherein the interrupt routine includes one or more additional instructions that are not included in the batch of instructions, and wherein the scheduler unit is configured to prioritize the dispatching of the one or more additional instructions included in the interrupt routine over the plurality of instructions in the batch of instructions, and
cause batch-level resources to be stored in a memory to resume execution of the batch of instructions once the interrupt routine has finished execution.

15. The system of claim 14, wherein the memory is a register file, and the scheduler unit is further configured to store the batch-level resources in a portion of the register file allocated to the batch of instructions.

16. The system of claim 15, wherein the portion of the register file is allocated to the batch of instructions by the scheduler unit prior to dispatching the at least one instruction from the batch of instructions to one or more functional units for execution.

17. The system of claim 14, wherein the scheduler unit is further configured to:
receive a second batch of instructions; and
dispatch at least one instruction from the second batch of instructions to the one or more functional units for execution.

18. The system of claim 17, wherein the at least one instruction from the second batch of instructions is dispatched prior to dispatching every instruction in the batch of instructions to the functional units for execution.

19. The system of claim 14, wherein the one or more functional units and the scheduler unit are included in a graphics processing unit (GPU).

20. The system of claim 14, wherein the scheduler unit is further configured to allocate a portion of a register file for storing the batch-level resources in response to receiving the interrupt request.

* * * * *

UNITED STATES PATENT AND TRADEMARK OFFICE
CERTIFICATE OF CORRECTION

| | | |
|---|---|---|
| PATENT NO. | : 9,477,480 B2 | Page 1 of 1 |
| APPLICATION NO. | : 14/169082 | |
| DATED | : October 25, 2016 | |
| INVENTOR(S) | : Olivier Giroux et al. | |

It is certified that error appears in the above-identified patent and that said Letters Patent is hereby corrected as shown below:

On the Title Page

Item (57), In the abstract:
Line 2 please replace "interruptible hatches" with --interruptible batches--.

Signed and Sealed this
Seventeenth Day of March, 2020

Andrei Iancu
*Director of the United States Patent and Trademark Office*